(12) United States Patent
Yang et al.

(10) Patent No.: US 10,997,900 B2
(45) Date of Patent: May 4, 2021

(54) LED LIGHT BAR NETWORK CURRENT FOLDBACK CIRCUIT, DRIVING POWER SUPPLY AND TV SET

(71) Applicant: SHENZHEN CHUANGWEI-RGB ELECTRONIC CO., LTD, Shenzhen (CN)

(72) Inventors: Jitao Yang, Shenzhen (CN); Jianzhong Chen, Shenzhen (CN)

(73) Assignee: SHENZHEN CHUANGWEI-RGB ELECTRONIC CO., LTD., Shenzhen (CN)

( * ) Notice: Subject to any disclaimer, the term of this patent is extended or adjusted under 35 U.S.C. 154(b) by 174 days.

(21) Appl. No.: 16/464,176

(22) PCT Filed: Jan. 22, 2018

(86) PCT No.: PCT/CN2018/073605
§ 371 (c)(1),
(2) Date: May 24, 2019

(87) PCT Pub. No.: WO2019/000924
PCT Pub. Date: Jan. 3, 2019

(65) Prior Publication Data
US 2020/0294444 A1 Sep. 17, 2020

(30) Foreign Application Priority Data

Jun. 27, 2017 (CN) .......................... 201710501014.5

(51) Int. Cl.
*H05B 45/50* (2020.01)
*G09G 3/32* (2016.01)
*H05B 47/25* (2020.01)

(52) U.S. Cl.
CPC ....... *G09G 3/32* (2013.01); *G09G 2310/0264* (2013.01); *G09G 2330/04* (2013.01); *H05B 45/50* (2020.01); *H05B 47/25* (2020.01)

(58) Field of Classification Search
CPC ....... G09G 2310/0264; G09G 2330/04; G09G 3/32; H05B 45/50; H05B 45/52; H05B 45/54; H05B 47/25
See application file for complete search history.

(56) References Cited

FOREIGN PATENT DOCUMENTS

CN 102858049 A 1/2013
CN 103269548 A * 8/2013 ............. H05B 45/37
(Continued)

OTHER PUBLICATIONS

The World Intellectual Property Organization (WIPO) International Search Report for PCT/CN2018/073605 dated April 20, 2018 6 Pages.

*Primary Examiner* — Kyle J Moody
*Assistant Examiner* — Jye-June Lee
(74) *Attorney, Agent, or Firm* — Anova Law Group, PLLC

(57) ABSTRACT

LED light bar network current foldback circuit comprises: voltage reference module, voltage division and sampling module, comparison module. Power supply voltage passes through voltage reference module, generates voltage reference to voltage division and sampling module and comparison module; voltage division and sampling module performs voltage division on voltage reference, and outputs reference voltage to comparison module, which further receives detection voltage from converting detection current of LED light bars, before comparing with reference voltage; if detection voltage is greater than reference voltage, comparison module outputs driving stop command to control LED light bars to stop working. LED light bar network current foldback (Continued)

circuit controls driving circuit to stop working after current of LED light bars, or constant output current, increases abnormally, protecting LED light bars effectively, avoiding high screen body maintenance cost from LED light bars damaging.

18 Claims, 4 Drawing Sheets

(56) References Cited

FOREIGN PATENT DOCUMENTS

| | | | |
|---|---|---|---|
| CN | 103269548 A | | 8/2013 |
| CN | 103687240 A | | 3/2014 |
| CN | 104935843 A | * | 9/2015 |
| CN | 106304492 A | | 1/2017 |
| CN | 206196094 U | | 5/2017 |
| CN | 1071727755 A | | 9/2017 |
| JP | 2002270384 A | | 9/2002 |

* cited by examiner

LED LIGHT BAR NETWORK CURRENT FOLDBACK CIRCUIT, DRIVING POWER SUPPLY AND TV SET

CROSS-REFERENCES TO RELATED APPLICATIONS

This application is a national stage application of PCT Patent Application No. PCT/CN 2018/073605, filed on 22 Jan. 2018, which claims priority to Chinese Patent Application No. 201710501014.5, filed on 27 Jun. 2017, the content of all of which is incorporated herein by reference.

FIELD OF THE INVENTION

The present invention relates to the field of electrical power supply technology, and more particularly, to an LED light bar network current foldback circuit, a driving power supply and a TV set.

BACKGROUND

With a development of technology, a safety protection of a circuit has attracted more and more attention. In the prior arts, a large-size LED TV adopts a high-efficiency power direct-drive power supply circuit when working. But at present, there is not yet a perfect protection circuit, especially an overcurrent protection circuit for an LED light bar. Without such a protection, a screen light strip may be damaged under some abnormal conditions, thereby causing a high maintenance cost for a screen body.

Therefore, the current technology needs to be improved and developed.

BRIEF SUMMARY OF THE DISCLOSURE

According to the above described defects, the purpose of the present invention is providing an LED light bar network current foldback circuit, a driving power supply and a TV set, being able to control a drive circuit stop working when a current in the LED light bar, that is, a constant output current, increases abnormally, thus protecting the LED light bar effectively, avoiding a damage of the LED light bar causing a high maintenance cost for a screen.

In order to achieve the above mentioned goals, the technical solution of the present invention to solve the technical problems is as follows:

An LED light bar network current foldback circuit, connecting to a LED light bar network, wherein comprises a voltage reference module, a voltage division and sampling module and a comparison module; a supplied voltage passes through the voltage reference module and generates a voltage reference, before outputting to the voltage division and sampling module and the comparison module, then the voltage division and sampling module performs a voltage division on the voltage reference, and outputs a reference voltage to the comparison module; the comparison module further receives a detection voltage obtained by converting a detection current of the LED light bar, and compares the detection voltage with the reference voltage; when the detection voltage is greater than the reference voltage, the comparison module outputs a stop driving command to control the LED light bars to stop working.

The LED light bar network current foldback circuit, wherein the voltage reference module comprises a first rectifying unit and a voltage generating unit, a voltage of the LED light bar provides the supplied voltage for the comparison module after being rectified by the rectifying unit, and outputs the voltage reference to the voltage division and sampling module and the comparison module through the voltage generating unit.

The LED light bar network current foldback circuit, wherein the comparison module comprises a comparison chip and a protection unit, applied to protecting the comparison chip, the first rectifying unit comprises a first rectifier diode, a second rectifier diode, and a first conversion resistor, both positive poles of the first rectifier diode and the second rectifier diode are connected to an anode of the LED light bar, both negative poles of the first rectifier diode and the second rectifier diode are connected to an eighth pin of the comparison chip and the protection unit through the first conversion resistor.

The LED light bar network current foldback circuit, wherein the protection unit comprises a Zener diode, a positive pole of the Zener diode is grounded, and a cathode of the Zener diode is connected to the eighth pin of the comparison chip and the voltage generating unit.

The LED light bar network current foldback circuit, wherein the voltage generating unit comprises a second conversion resistor, one end of the second conversion resistor connects to the negative pole of the Zener diode, another end of the second conversion resistor connects to a third pin of the comparison chip and the voltage division and sampling module.

The LED light bar network current foldback circuit, wherein the voltage division and sampling module comprises a first voltage dividing resistor and a second voltage dividing resistor, one end of the first voltage dividing resistor connects to another end of the second converting resistor, and another end of the first voltage dividing resistor connects to a sixth pin of the comparison chip and further connects to a fourth pin of the comparison chip and the ground through the second voltage dividing resistor.

The LED light bar network current foldback circuit, wherein a model of the comparison chip is AP4310 or TL103.

An LED light bar network driving power supply, connecting to a LED light bar network, wherein comprises a constant current source module and the LED light bar network current foldback circuit described above, the constant current source module provides a constant current with a current direction alternating to the LED light bar network, the LED light bar network current foldback circuit outputs the stop driving command to the constant current source module when a detection current of the LED light bar greater than a current threshold, to control the LED light bar to stop working.

The LED light bar network driving power supply, wherein the constant current source module comprises a driving unit, a constant current control unit, a detection unit and a second rectifying unit, the LED light bar network comprises a plurality of LED light bar groups connected in parallel through the second rectifying unit, each LED light bar group comprises a plurality of LED light bars connected in series by the detection unit;

during each driving circle, the driving unit outputs alternatively a forward supply current and a reverse supply current during a first half cycle and a second half cycle, and outputs to the LED light bar after rectified by the second rectifying unit, the detection unit detects the current in the LED light bar, and converts a detected current into a voltage signal before outputting to the constant current control unit, and the constant current control unit controls a work frequency of the driving unit according to the voltage signal, making a size of the supply current always constant.

The LED light bar network driving power supply, wherein further comprising: a filter circuit, an PFC circuit and a constant voltage source module, an input AC power is converted into a DC and output to the PFC circuit through a low pass filtering process by the filter circuit, then the DC is output to the constant voltage source module and the constant current source module respectively after a power factor correction by the PFC circuit, the constant voltage source module provides a constant voltage accordingly for a main board according to a standby signal.

The LED light bar network driving power supply, wherein the constant voltage source module comprises a PWM control circuit and a flyback transformer, the PWM control circuit controls the flyback transformer to output a constant voltage accordingly to the main board according to the standby signal received.

The LED light bar network driving power supply, wherein the driving unit comprises an LLC resonance bridge, an LLC transformer and a balancer, the LLC transformer outputs alternately a forward supply current and a reverse supply current during a first half cycle and a second half cycle, and outputting to the second rectifying unit after voltage divided by a balancer, the constant current control unit controls a work frequency of the LLC resonance bridge according to the voltage signal, making a size of a supply current output by the LLC transformer always constant.

The LED light bar network driving power supply, wherein the constant current source module further comprises an isolation transformer, the isolation transformer drives the LLC resonance bridge to oscillate at a working frequency correspondingly according to a drive signal output by the constant current control unit.

The LED light bar network driving power supply, wherein the LLC resonance bridge comprises a first MOS transistor, a second MOS transistor, an inductor and a first capacitor, the balancer comprises a second capacitor; a drain of the first MOS transistor connects to a first output end of the PFC circuit, a gate of the first MOS transistor connects to a fifth pin of the isolation transformer, a source of the first MOS transistor connects to a fourth pin of the isolation transformer, a drain of the second MOS transistor, and a first pin of the LLC transformer; a gate of the second MOS transistor connects to a first pin of the isolation transformer, a source of the second MOS transistor connects to a second pin of the LLC transformer and the ground; one end of the first capacitor connects to the second pin of the LLC transformer through the inductor, another end of the first capacitor is grounded; a third pin of the LLC transformer connects to a first end of the second rectifying unit through the balancer, and a fourth pin of the LLC transformer connects to a second end of the second rectifying unit.

A television set, wherein comprising an LED light bar network driving power supply as described above.

Comparing to the prior arts, the LED light bar network current foldback circuit, the driving power supply and the TV set provided by the present invention, wherein the LED light bar network current foldback circuit comprises a voltage reference module, a voltage division and sampling module, and a comparison module; the supplied voltage generates a voltage reference by the voltage reference module, and the voltage reference is then output to a voltage division and sampling module, and a comparison module; the voltage division and sampling module divides the voltage reference and outputs a reference voltage to the comparison module; the comparison module further receives a detection voltage obtained by converting a detection current of the LED light bar, and comparing the detection voltage with the reference voltage. When the detection voltage is greater than the reference voltage, the comparison module outputs a stop driving command to control the LED light bar to stop working. Being able to control the driving circuit to stop working after the current in the LED light bar, that is, the constant current output current, is abnormally increased, the present invention may effectively protect the LED light bar, and avoid a damage of the LED light bar from resulting in a high screen maintenance cost.

DETAILED DESCRIPTION OF EMBODIMENTS

The present invention provides an LED light bar network current foldback circuit, a driving power supply and a TV set, being able to control a drive circuit stop working when a current in the LED light bar, that is, a constant output current, increases abnormally, thus protecting the LED light bar effectively, avoiding a damage of the LED light bar causing a high maintenance cost for a screen.

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
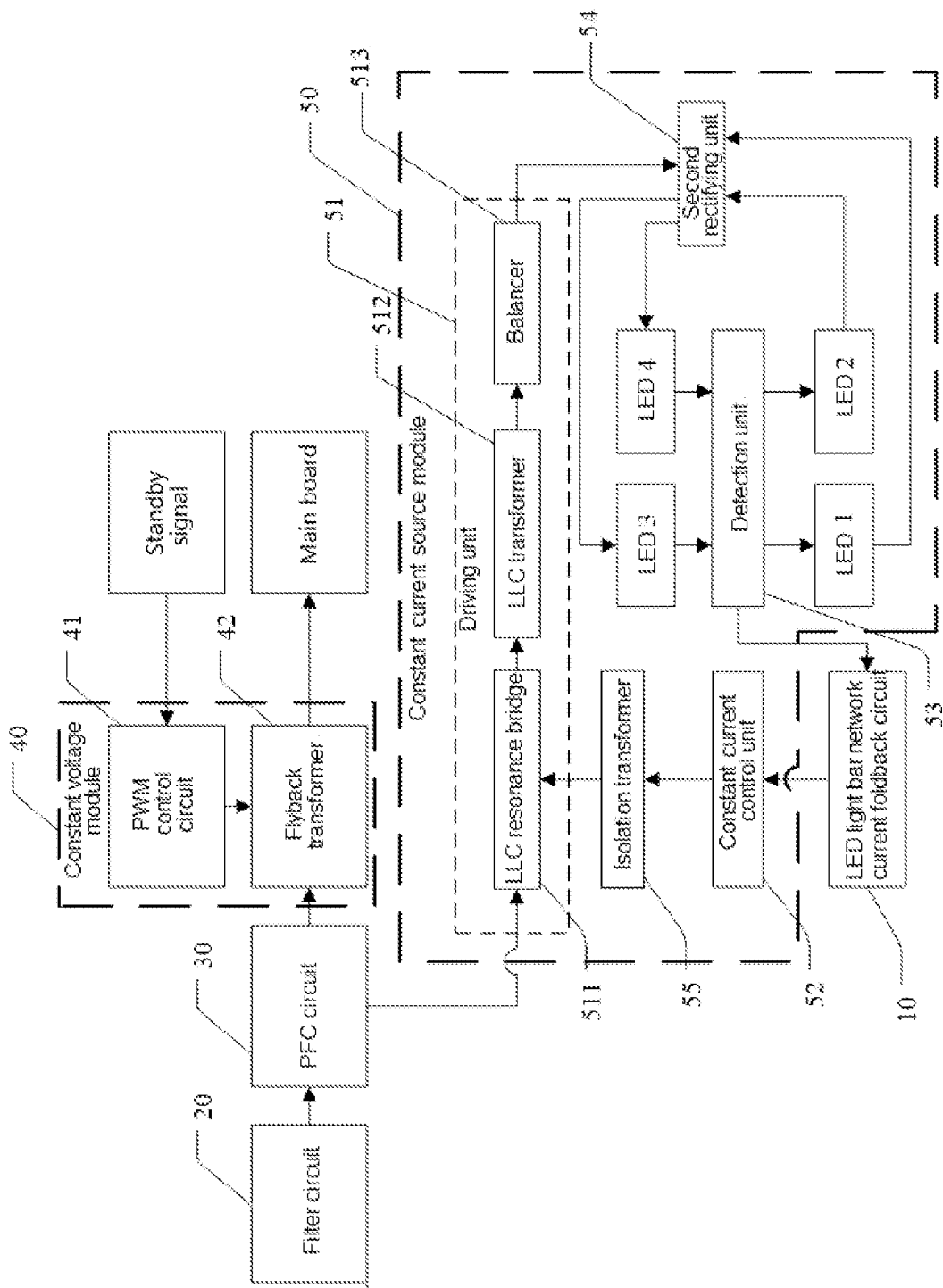
FIG. 1 illustrates a structural block diagram of an LED light bar network driving power supply provided by the present invention.

Referencing to FIG. 1, the LED light bar network driving power supply provided by the present invention comprises a constant current source module and an LED light bar network current foldback circuit 10, preferably, the LED light bar network driving power supply further comprises a filter circuit 20, an PFC circuit 30, a constant voltage source module 40 and a constant current source module 50, the filter circuit 20 connects to the PFC circuit 30, and a first output end of the PFC circuit 30 connects to the constant voltage source module, a second output end of the PFC circuit 30 connects to the constant voltage source module 40, the constant voltage source module 40 further connects to a main board for power supply, the constant current source module 50 further connects and providing a constant current source to an LED light bar network in serial or in parallel, the constant current source module 50 further connects to the LED light bar network current foldback circuit 10. It should be understood that, both the filter circuit 20 and the PFC circuit 30 belong to the current technology, no detailed descriptions on the function and the connection method thereof are listed here.

In an embodiment, an input AC power is converted into a DC after a voltage conversion, the DC is output to the PFC circuit 30 after a low pass filtering process by the filter circuit 20, before being output to the constant voltage module 40 and the constant current source module 50 respectively, after a power factor correction by the PFC circuit 30, the constant voltage module 40 provides a constant voltage accordingly for a main board according to a standby signal; the constant current source module 50 provides a constant current with a direction changing alternatively for the LED light bar network connected in serial or in parallel, also, the present invention further outputs a stop driving command to the constant current source module by the LED light bar network current foldback circuit 10, when a detection current of the LED light bar is greater than a current threshold, to control the LED light bar to stop working, that protects effectively a work current of the LED light bar, avoiding the LED light bar from being burnt, and improving a safety of the circuit.

Figure 2:
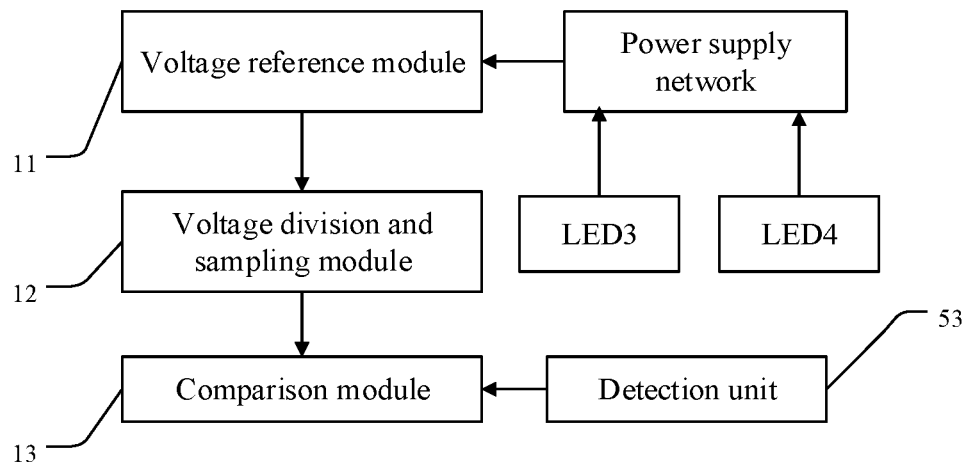
FIG. 2 illustrates a structural block diagram of an LED light bar network current foldback circuit provided by the present invention.

Further, referencing to FIG. 2 together, the LED light bar network current foldback circuit comprises a voltage reference module 11, a voltage division and sampling module 12 and a comparison module 13, the voltage reference module 11, the voltage division and sampling module 12 and the comparison module 13 are connected sequentially, the comparison module 13 further connects to a detection unit in the constant current source module, a power supply voltage of the LED light bar network is connected to a supplied power network, the power supply voltage generates a voltage reference by the voltage reference module 11, and the voltage division and sampling module 12 performs a voltage division on the voltage reference, and outputs a reference voltage to the comparison module 13, at a same time, the comparison module 13 further receives a detection voltage obtained by converting a detection current of the LED light bar, and compares the detection voltage with the reference voltage; when the detection voltage is greater than the reference voltage, that means now the current in the LED light bar is over high, thus the comparison module 13 outputs a stop driving command to the constant current source module, and controls the LED light bars to stop working. Preferably, the voltage reference module 11 and the comparison module 13 may be integrated in a same IC, to improve an integration degree of the circuit, for example, it adopts an IC with a TI model of TL103WAIDR, and there are no limitations on this in the present invention.

The LED light bar network current foldback circuit 10 may output the stop driving command on time when the current in the LED light bar is over large, by comparing accurately the reference voltage and the detection voltage reflecting the current in the LED light bar, before triggering the circuit stop working on time, thus preventing effectively the LED light bar from being burnt, and lowering a maintenance cost of a whole device. Wherein the LED light bar network current foldback circuit 10 may be applied to different power sources in a plurality of fields, including a TV set power source, a monitor power source, an LED illustration power source, a projector, a plurality of medical devices and more, improves effectively a safety of the circuit, avoiding an LED backlight source from being burnt, thus lowering a maintenance cost for the screen.

Figure 3:
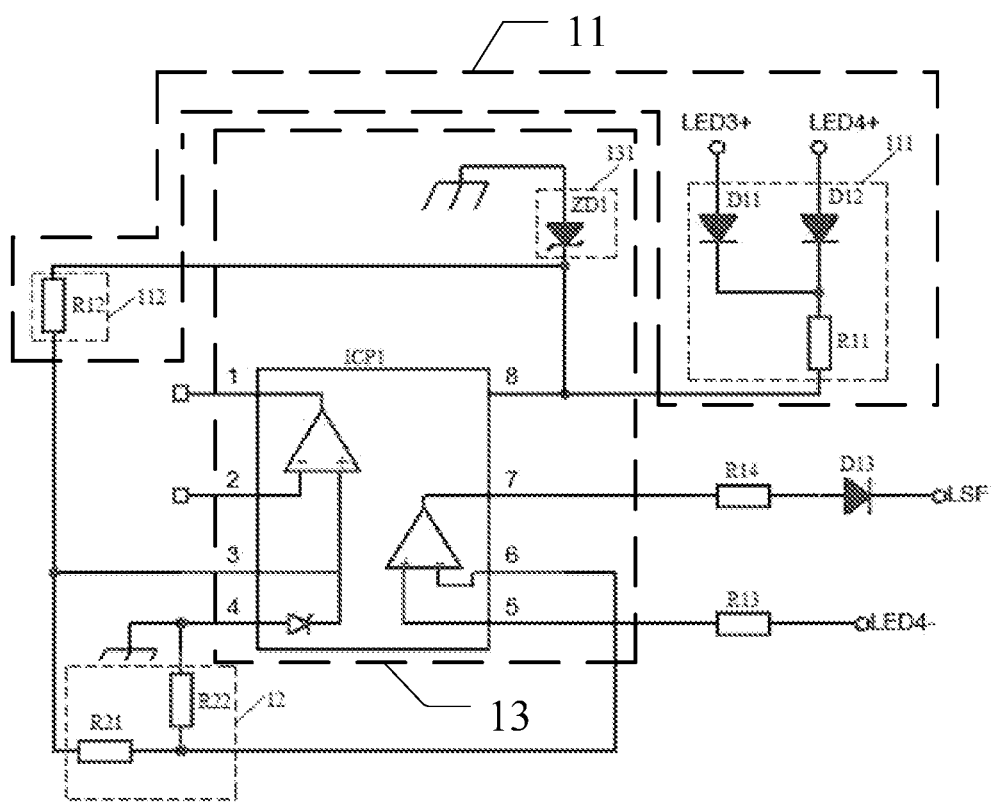
FIG. 3 illustrates a circuit diagram of an LED light bar network current foldback circuit provided by the present invention.

Further, referencing to FIG. 3 together, the voltage reference module 11 comprises a first rectifying unit 111 and a voltage generating unit 112, the first rectifying unit 111 connects to the comparison module 13 and the voltage generating unit 112, the voltage generating unit 112 further connects to the voltage division and sampling module 12, specifically, a voltage of the LED light bar provides a supply voltage for the comparison module 13 after being rectified by the rectifying unit, also the voltage generating unit 112 outputs the voltage reference to the voltage division and sampling module 12 and the comparison module 13, according to the supply voltage, providing a reliable voltage reference for later voltage comparison.

Preferably, the comparison module 13 comprises a comparison chip ICP1 and a protection unit 131 applied to protecting the comparison chip ICP1. The first rectifying unit 111 comprises a first the first rectifying unit comprises a first rectifier diode D11, a second rectifier diode D12, and a first conversion resistor R11, both positive poles of the first rectifier diode D11 and the second rectifier diode D12 are connected to an anode of the LED light bar, both cathodes of the first rectifier diode D11 and the second rectifier diode D12 are connected to an eighth pin of the comparison chip ICP1 and the protection unit 131 through the first conversion resistor R11. The protection unit 131 comprises a Zener diode ZD1, a positive pole of the Zener diode ZD1 is grounded, and a cathode of the Zener diode ZD1 is connected to the eighth pin of the comparison chip ICP1 and the voltage generating unit 112, wherein a preferred model of the comparison chip ICP1 is AP4310 or TL103.

In the present embodiment, after passing through the first conversion resistor R11 and the second conversion resistor R12 respectively, both voltages of a supplied voltage passed through two routes of the LED light bar supply for a power supply pin VCC of the comparison chip ICP1, after being voltage converted by the first conversion resistor R11, and stabilize the supplied voltage of the comparison chip ICP1 through the Zener diode ZD1 to improve a stability and a safety of the comparison chip ICP1 in working, as well as both voltages of the supplied voltage passed through two routes of the LED light bar working as the supplied power after being rectified, make a voltage of the LED light bar 0 after the LED light bar is off, while the comparison chip ICP1 needs no working either, and the supplied voltage is 0, that reduces a loss of the comparison chip ICP1 during standby, thereby reducing a standby loss of a whole device.

Further, the voltage generating unit 112 comprises a second conversion resistor R12, one end of the second conversion resistor R12 connects to the negative pole of the Zener diode ZD1, another end of the second conversion resistor R12 connects to a third pin of the comparison chip ICP1 and the voltage division and sampling module 12. The supplied power VCC generates the voltage reference for the third pin of the comparison chip ICP1 after passing through the second conversion resistor R12, while providing a voltage basis for the voltage division and sampling module 12.

Preferably, The voltage division and sampling module 12 comprises a first voltage dividing resistor R21 and a second voltage dividing resistor R22, one end of the first voltage dividing resistor R21 connects to another end of the second converting resistor R12, and another end of the first voltage dividing resistor R21 connects to a sixth pin of the comparison chip ICP1 and further connects to a fourth pin of the comparison chip ICP1 and the ground through the second voltage dividing resistor R22. The LED light bar network current foldback circuit 10 further comprises a thirteenth resistor R13, a fourteenth resistor R14 and a thirteenth diode D13, one end of the thirteenth resistor R13 connects to a fifth pin of the comparison chip ICP1, another end of the thirteenth resistor R13 connects to a detection unit of the constant current source module, one end of the fourteenth resistor R14 connects to a seventh pin of the comparison chip ICP1, another end of the fourteenth resistor R14 connects to a cathode of the thirteenth diode D13, an anode of the thirteenth diode D13 connects to the constant current source module.

In a specific implementation, after generating the voltage reference, a reference voltage for the sixth pin of the comparison chip ICP1 is achieved after voltage dividing and sampling by the first voltage dividing resistor R21 and the second voltage dividing resistor R22, and the fifth pin of the comparison chip ICP1 receives the detection voltage output from the constant current source module, specifically, the detection unit of the constant current source module samples the current, before converting into a voltage signal and connecting to the fifth pin of the comparison chip ICP1 after being current limited by the thirteenth resistor R13. When a detection current is increasing, a detection voltage converted is also increasing accordingly, when the detection voltage is larger than a reference voltage of the sixth pin, the comparison chip ICP1 outputs the stop driving command through the seventh pin, which is a high level in the present embodiment, that is, when the LED light bar current increases abnormally, the seventh pin of the comparison chip ICP1 outputs the high level, before connecting to the constant current source module through the fourteenth resistor R14 and the thirteenth diode D13, and controlling the constant current source module to stop outputting the current, so as to protecting the LED light bar from working before being damaged under a large current and a high load. The present invention obtains the reference voltage through the voltage division and sampling module 12, and a plurality of reference units for sampling may be adjusted freely according to any requirements, thus it is able to adjust a size of the reference voltage according to any real requirements, making an overcurrent protection value be accurately adjusted to a preset value, thus improving an accuracy of the overcurrent protection.

Preferably, referencing to FIG. 1 again, in a preferred embodiment of the present invention, the constant current source module 40 comprises a PWM control circuit 41 and a flyback transformer 42, the PWM control circuit 41 connects to the flyback transformer 42, the flyback transformer 42 connects to a second output end of the PFC circuit 30 and the main board, the PWM control circuit 41 controls the flyback transformer 42 to output a constant voltage accordingly to the main board according to the standby signal received. Specifically, when the standby signal is in a high level, the PWM control circuit 41 controls the flyback transformer 42 to output a rated voltage for work that the main board requires, making the main board work normally; when the standby signal is in a low level, the PWM control circuit 41 controls the flyback transformer 42 to output a standby voltage that the main board requires, which is far lower than the rated voltage for work. Outputting a constant voltage according to different standby signals, has lowered a power consumption of a system in a whole. It should be understood that, both the PWM control circuit 41 and the flyback transformer 42 belong to the prior art, no more details on the function and the connection methods thereof are stated herein.

The constant current source module 50 comprises a driving unit 51, a constant current control unit 52, a detection unit 53 and a second rectifying unit 54, the driving unit 51 connects to the first output end of the PFC circuit 30 and the second rectifying unit 54, the constant current control unit 52 connects to the driving unit 51 and the detection unit 53, wherein the LED light bar network comprises a plurality of LED light bar groups connected in parallel through the second rectifying unit 54, each LED light bar group comprises a plurality of LED light bars connected in series by the detection unit 53, shown as FIG. 2, LED1, LED2, LED3 and LED4 represent four light bars, wherein the light bar of LED3 connects to the light bar of LED1 in series by the detection unit 53, before becoming a group of the LED light bar group, the light bar of LED4 connects to the light bar of LED2 in series by the detection unit 53, before becoming another group of the LED light bar group, both groups are connected in parallel through the second rectifying unit 54. It should be understood that, the present invention has no limitation on an amount of the LED light bars, a manufacturer may make a section flexibly, according to a specific product requirement. And in a plurality of preferred embodiments listed hereof, the amount of the LED light bars is selected and explained by four.

Under a control of the constant current control unit 52, during each driving circle, the driving unit 51 outputs alternatively a forward supply current and a reverse supply current during a first half cycle and a second half cycle, and outputs to the LED light bar after rectified by the second rectifying unit 54, that is, the driving unit 51 drives a part of the LED light bars during a first half cycle, and drives other part of the LED light bars during a second half cycle. While in a process of driving, the detection unit 53 detects the current in the LED light bar, and converts a detected current into a voltage signal before outputting to the constant current control unit 52 and the fifth pin of the comparison chip ICP1, and the constant current control unit 52 controls a work frequency of the driving unit 51, according to the voltage signal, keeping a size of the supply current output by the driving unit 51 always constant, before achieving a target of constant current driving. And through the detection unit 53 providing a voltage value detected in a real time for an overcurrent protection, the comparison chip ICP1 may output the stop driving command in time to the constant current control unit 52 when the detection voltage is larger than the reference voltage, controlling the driving unit 51 to stop working, thus protecting effectively the LED light bars from being damaged.

In the present embodiment, since the supply currents of all light bars are all under an oscillation control of the driving unit 51, the driving unit 51 provides a current in a different direction alternatively in each cycle, turning part of the LED light bars on during a first half cycle, and other part of the LED light bars on during a second half cycle, when the driving unit 51 has a work frequency high enough, making a driving cycle less than a visual persistence time of human eyes (for example, 50 Hz), then the LED light bar will be seen in a steady light state from human eyes, and that satisfies a constant current requirement for a multi-channel LED light bar, and improves a power source conversion efficiency.

Specifically, the constant current source module further comprises an isolation transformer 55, the driving unit 51 comprises an LLC resonance bridge 511, an LLC transformer 512 and a balancer 513, the constant current control unit 52 connects to the LLC resonance bridge 511 through the isolation transformer 55, the LLC resonance bridge 511 further connects to the first output end of the PFC circuit 30 and the LLC transformer 512, the LLC transformer 512 further connects to the second rectifying unit 54 through the balancer 513.

The constant current control unit 52 outputs a drive signal to the isolation transformer 55 according to a voltage signal after receiving the voltage signal output from the detection unit 53, and the isolation transformer 55 drives the LLC resonance bridge 511 make an oscillation control in a work frequency accordingly, to control a size of the supply current output from the LLC transformer 512 always constant, while the LLC transformer 512 outputs alternately a forward supply current and a reverse supply current in a first half cycle and a second half cycle, and outputting to the second rectifying unit 54 after voltage divided by the balancer 513, before outputting to the LED light bars accordingly. Providing a constant current to an LED light bar accordingly in a different time, has satisfied the constant current requirement for a multi-channel light bar in a large-sized TV, and improved the power source conversion efficiency. While connecting a balancer 513 to an output end of the LLC transformer 512, to divide a voltage difference of the LED light bars connected in parallel to both ends of the balancer 513, before making the current passing through the LED light bars always in a constant state, so as to solve a problem on supplying a constant current for the multi-channel LED light bars where a voltage is inconsistent.

Figure 4:
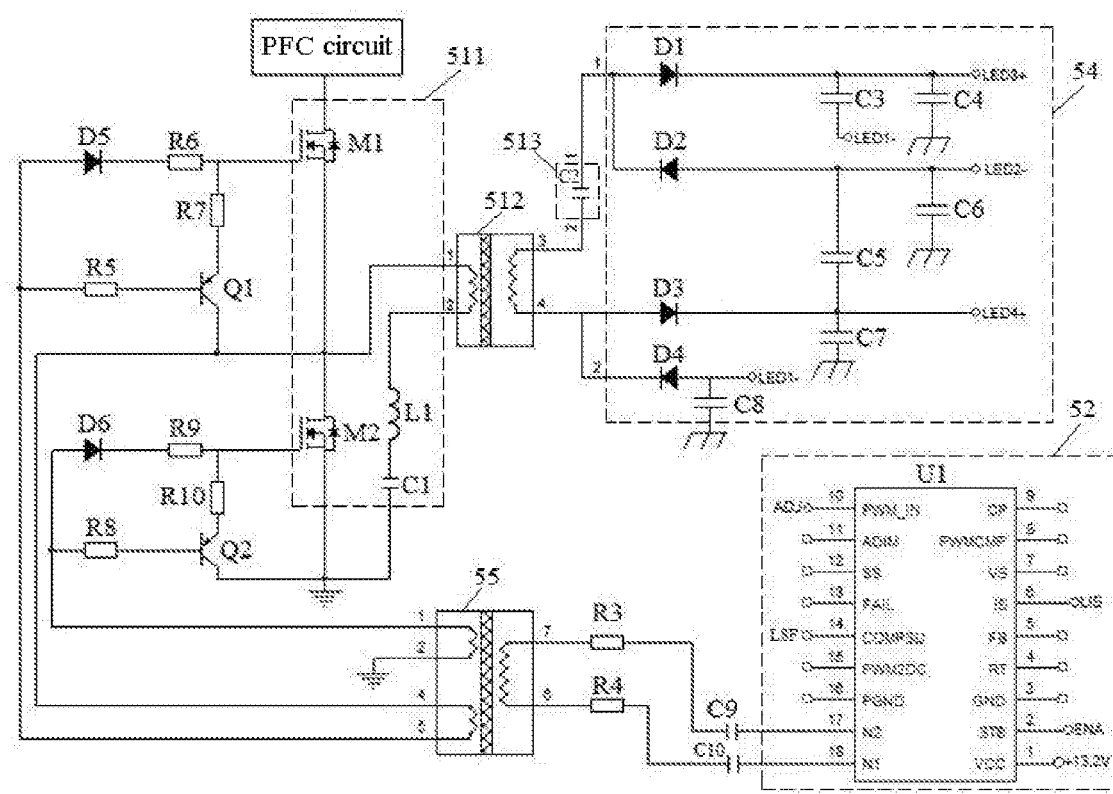
FIG. 4 illustrates a circuit diagram of a constant current source module in an LED light bar network driving power supply provided by the present invention.
Figure 5:
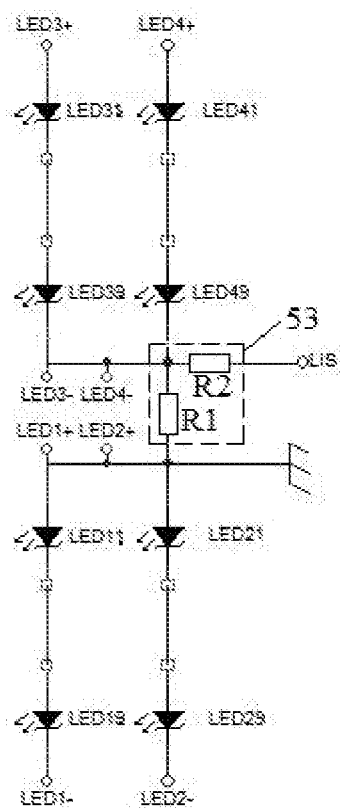
FIG. 5 illustrates a circuit diagram of an LED light bar and a detection unit in an LED light bar network driving power supply provided by the present invention.

Further, referencing to FIG. 4 and FIG. 5 together, a plurality of light emitting diodes LED11 . . . LED 19 has composed a light bar of LED1, a plurality of light emitting diodes LED21 . . . LED 29 has composed a light bar of LED2, a plurality of light emitting diodes LED31 . . . LED 39 has composed a light bar of LED3, a plurality of light emitting diodes LED41 . . . LED 49 has composed a light bar of LED4. In the present invention, a plurality of LED light bars has composed a network in serial or in parallel through the detection unit 53 and the second rectifying unit 54, and the LLC resonance bridge 511 in a high efficiency outputs to directly drive the LED light bars, while another output end of the PFC circuit 30 connects to a flyback power supply and supplies a constant voltage for the main board, achieving an output of both constant current and constant voltage, greatly lowering a system cost.

Wherein, the LLC resonance bridge 511 comprises a first MOS transistor M1, a second MOS transistor M2, an inductor L1 and a first capacitor C1, the balancer 513 comprises a second capacitor C2; a drain of the first MOS transistor M1 connects to a first output end of the PFC circuit 30, a gate of the first MOS transistor M1 connects to a fifth pin of the isolation transformer 55, a source of the first MOS transistor M1 connects to a fourth pin of the isolation transformer 55, a drain of the second MOS transistor M2, and a first pin of the LLC transformer 512; a gate of the second MOS transistor M2 connects to a first pin of the isolation transformer 55, a source of the second MOS transistor M2 connects to a second pin of the LLC transformer 512 and the ground; one end of the first capacitor C1 connects to the second pin of the LLC transformer 512 through the inductor L1, another end of the first capacitor C1 is grounded; a third pin of the LLC transformer 512 connects to a first end of the second rectifying unit 54 through the balancer 513, and a fourth pin of the LLC transformer 512 connects to a second end of the second rectifying unit 54. In the present embodiment, both the first MOS transistor M1 and the second MOS transisitor M2 are N-channel MOS transistor.

In a specific implement, since the light bars of LED3 and LED1 connected in parallel and the light bars of LED4 and LED2 have a relatively large voltage difference, making the voltage output from the LLC transformer 512 inconstant, and further cause the current flowing over two big light strings inconsistent, thus the present invention connects in serial a balancer 513 on the output end of the LLC transformer 512, i.e., the second capacitor C2, dividing a voltage difference between the LED light bars on both ends of the balancer 513, and making the current flowing over the light bars keep in a constant current state, even the voltage difference of the LED lights connected to an output end of a rectifying bridge is relatively large. That solves the problem on supplying a constant current for the multi-channel light bars where a voltage is inconsistent.

Specifically, the second capacitor C2 acting as the balancer 513, is able to make the currents flowing over a group of LED1 . . . LED1$n$ and a group of LED2 . . . LED2$n$ equal, a work principle is: when the group of light bars of LED3 and LED1 has a voltage larger than that of the group of light bars of LED4 and LED2, that is, during a first half output cycle of the LLC transformer 512, a twelfth pin of the LLC is positive, a voltage on a second pin of the second capacitor C2 is larger than that on a first pin; during a second half output cycle of the LLC transformer 512, the twelfth pin of the LLC is negative, the voltage on the second pin of the second capacitor C2 is less than that on the first pin, in such a way, dividing the voltage difference of both strings of the light bars on both ends of the second capacitor C2, makes the current flowing over the group of light bars of LED3 and LED1 equal to that over the group of light bars of LED4 and LED2, before achieving an equal current for both groups.

Further, the detection unit 53 comprises a first resistor R1 and a second resistor R2, each group of the LED light bars comprises a first light bar unit and a second light bar unit. For example, in the present embodiment, the light bar of LED1 and the light bar of LED3 compose a group of the LED light bars, and the light bar of LED2 and the light bar of LED4 compose another group of the LED light bars, both groups of light bars comprise the first light bar unit and the second light bar unit, wherein the light bar of LED3 and the light bar of LED4 act as the first light bar unit in both groups of the LED light bars respectively, and the light bar of LED1 and the light bar of LED2 act as the second light bar unit in both groups of the LED light bars respectively, one end of the first resistor R1 connects to a negative end of the first light bar unit, one end of the second resistor R2 and another end of the thirteenth resistor R13, another end of the first resistor R1 connects to all positive ends of the second light bar unit; another end of the second resistor R2 connects to the constant current control unit 52. By the first resistor R1, the current in the LED light bar is detected before converting into a voltage signal, followed by outputting the voltage signal to the constant current control unit 52 and the fifth pin of the comparison chip ICP1, through the second resistor R2, the constant current control unit 52 adjusts a work frequency of the LLC resonance bridge 511 according to the voltage signal, making the LLC transformer 512 always keep a constant current output, while providing a detection voltage value for the comparison chip ICP1.

Further, the second rectifying unit 54 comprises a first diode D1, a second diode D2, a third diode D3 and a fourth diode D4; the LED light bar group comprises a first part of the light bar group and a second part of the light bar group, the first part of the light bar group and the second part of the light bar group are in parallel through the second rectifying unit 54. For example, in the present embodiment, the first part of the light bar group is composed by the light bar of LED1 and the light bar of LED3, the second part of the light bar group is composed by the light bar of LED2 and the light bar of LED4, a positive end of the first diode D1 connects to a negative end of the second diode D2, and connects to the third pin of the LC transformer 512 through the balancer 513, a negative end of the first diode D1 connects to a positive end of the first part of light bar group; a positive end of the second diode D2 connects to a negative end of the second part of light bar group; a positive end of the third diode D3 connects to a fourth pin of the LLC transformer 512 and a negative end of the fourth diode D4, a negative end of the third diode D3 connects to a positive end of the second part of light bar group; a positive end of the fourth diode D4 connects to a negative end of the first part of light bar group.

Preferably, the second rectifying unit 54 further comprises a third capacitor C3, a fourth capacitor C4, a fifth capacitor C5, a sixth capacitor C6, a seventh capacitor C7, and an eighth capacitor C8, one end of the third capacitor C3 connects to the negative end of the first diode D1, one end of the fourth capacitor C4 and the positive end of the first light bar group (a positive end of the light bar of LED3), a negative end of the third capacitor C3 connects to the negative end of the first part of the light bar group (a negative end of the light bar of LED1); another end of the forth capacitor C4 gets grounded; one end of the fifth capacitor C5 connects to a positive end of the second diode D2, one end of the sixth capacitor C6 and a negative end of the second part of light bar group (a negative end of the light bar of LED2), another end of the fifth capacitor C5 connects to one end of the seventh capacitor C7; another end of the sixth capacitor C6 gets grounded; one end of the seventh capacitor C7 further connects to the negative end of the third diode D3 and the positive end of the second part of the light bar group (the positive end of the light bar of LED4), another end of the seventh capacitor C7 gets grounded; one end of the eighth capacitor C8 connects to the positive end of the fourth diode D4 and the negative end of the first part of the light bar group (the negative end of the light bar of LED1), another end of the eighth capacitor C8 gets grounded. Voltage filtering each LED light bar by the third capacitor C3, the forth capacitor C4, the fifth capacitor C5, the sixth capacitor C6, the seventh capacitor C7 and the eighth capacitor C8, has reduced a ripple voltage of the LED light bar.

Under an oscillation control of the LLC resonance bridge 511, the LLC transformer 512 outputs a forward power supply current and an inverse power supply current, wherein, during a first half cycle, the LLC transformer 512 outputs the forward power supply current, that is, now a third pin of the LLC transformer 512 is positive, the supply current supplies the light bar of LED3 and the light bar of LED1 through the second capacitor C2, the first diode D1 and the fourth diode D4, now the current path is flowing over the second capacitor C2 and the first diode D1 before outputting to the light bar of LED3 from the third pin of the LLC transformer 512, followed by flowing over the fourth diode D4 after passing over the first resistor R1 and the light bar of LED1, before returning to the fourth pin of the LLC transformer 512, now both the light bar of LED1 and the light bar of LED3 are lit on, while under a flow direction control of the second rectifying unit 54, there is no current flowing through the light bar of LED2 and the light bar of LED4, shows an off state; then the LLC transformer 512 outputs an inverse supply current, during the second half cycle, that is, now the fourth pin of the LLC transformer 512 is positive, the supply current supplies power to the light bar of LED4 and the light bar of LED2 through the third diode D3, the second diode D2 and the second capacitor C2, now the current path is flowing over the third diode D3 before outputting to the light bar of LED4 from the fourth pin of the LLC transformer 512, followed by flowing over the second diode D2 and the second capacitor C2 after passing over the first resistor R1 and the light bar of LED2, before returning to the third pin of the LLC transformer 512, now both the light bar of LED2 and the light bar of LED4 are lit on, while under a flow direction control of the second rectifying unit 54, there is no current flowing through the light bar of LED1 and the light bar of LED3, shows an off state. Thus the supply currents of all LED light bars are lit on and lit off alternatively under an oscillation control, when the work frequency of the LLC resonance bridge 511 is larger than a preset value, from human eyes, the LED is seen in a constant on state, that has improved a conversion efficiency of the drive power, and lowered a system cost Further, the constant current control unit 52 comprises a constant current control chip U1, an STB end of the constant current control chip U1 connects to an ENA signal end, a PWM_IN end of the constant current control chip U1 connects to an ADJ signal end, an IS end of the constant current control chip U1 connects to the detection unit 53, an N1 end of the constant current control chip U1 connects to a sixth pin of the isolation transformer 55, an N2 end of the constant current control chip U1 connects to a seventh pin of the isolation transformer 55, a COMPSD end of the constant current control chip U1 connects to a seventh pin of the comparison chip ICP1, to receive the control signal output by the comparison chip ICP1. Preferably, before the constant current control chip U1 and the isolation transformer 55, it has further a third resistor R3, a fourth resistor R4, a ninth capacitor C9 and a tenth capacitor C10, one end of the third resistor R3 connects to a seventh pin of the isolation transformer 55, another end of the third resistor R3 connects to an N2 end of the constant current control chip U1 through the ninth capacitor C9; one end of the fourth resistor R4 connects to a sixth pin of the isolation transformer 55, another end of the fourth resistor R4 connects to an N1 end of the constant current control chip U1. The third resistor R3, the fourth resistor R4, the ninth capacitor C9 and the tenth capacitor C10 are mainly act as current limiting and filtering. In the present embodiment, the constant current drive chip adopts a BD9412 chip from ROHM, which owns a plurality of control functions including LLC control, a constant current adjusting, a plurality of control functions including EN, PWM and more, of course, it may also select other control chips having a same function, thus no limitations are stated herein.

The first resistor R1 converts the detected current into the voltage signal, and outputs to an IS end of the constant current control chip U1 through the second resistor R2, the constant current control chip U1 outputs the drive signal to the isolation transformer 55 through an N1 end and an N2 end thereof, and the isolation transformer 55 drives the LLC resonance bridge 511 on primary side, to control a work frequency of the LLC transformer 512, further control the LLC transformer 512 output a constant current, while the constant current control chip U1 receives the control signal output from the comparison chip ICP1 by a COMPSD end, and stops working according to the stop driving command output from the comparison chip ICP1 when the detection voltage is larger than the reference voltage, that is, when it is a high level, thus no more drive signal is output to the isolation transformer 55, and an LED driving is stopped to ensure the circuit safe.

Preferably, the isolation transformer 55 and the LLC resonance bridge 511 further connects to a drive circuit directly applied to driving the LLC resonance bridge 511, the drive circuit comprises a fifth diode D5, a sixth diode D6, a fifth resistor R5, a sixth resistor R6, a seventh resistor R7, an eighth resistor R8, a ninth resistor R9, a tenth resistor R10, a first triode Q1 and a second triode Q2; according to a voltage signal output from an output pin of the isolation transformer 55, the first triode Q1 and the second triode Q2 is controlled to be on and off, further the work states of the first MOS transistor M1 and the second MOS transistor M2 are controlled to achieve an LLC oscillation control.

Wherein a positive end of the fifth diode D5 connects to one end of the fifth resistor R5 and a fifth pin of the isolation transformer 55, a negative end of the fifth diode D5 connects to one end of the seventh resistor R7 and the gate of the first MOS transistor M1 through the sixth resistor R6; another end of the fifth resistor R5 connects to a base of the first triode Q1; another end of the seventh resistor R7 connects to the emitter of the first triode Q1; a collector of the first triode Q1 connects to a fourth pin of the isolation transformer 55; a positive end of the sixth diode D6 connects to one end of the eighth resistor R8 and a first pin of the isolation transformer 55, a negative end of the sixth diode D6 connects to one end of the tenth resistor R10 and a gate of the second MOS transistor M2 trough the ninth resistor R9; another end of the eighth resistor R8 connects to a base of the second triode Q2; another end of the tenth resistor R10 connects to an emitter of the second triode Q2; a collector of the first triode Q1 gets grounded.

A drive process of the LLC resonance bridge 511 is described hereafter: when the fifth pin of the isolation transformer 55 is in a low level, the first triode Q1 is on, the first triode Q1, the fifth resistor R5, the seventh resistor R7 compose a shutdown circuit for the first MOS transistor M1, a GS voltage of the first MOS transistor M1 is 0, and the first MOS transistor M1 is shutdown; the first pin of the first MOS transistor M1 is in a high level, the second triode Q2 is shutoff, a signal passes the sixth diode D6, the ninth resistor R9 controls a GS voltage of the second MOS transistor M2 be high, the second MOS transistor M2 turns on. When the fifth pin of the isolation transformer 55 is in a high level, the first triode Q1 is off, a signal passes through the fifth diode D5, the sixth resistor R6 controls the GS voltage of the first MOS transistor in a high level, the first MOS transistor M1 turns on; the first triode Q1, the fifth resistor R5, the seventh resistor R7 compose a shutdown circuit for the first MOS transistor M1, a GS voltage of the first MOS transistor M1 is 0, and the first MOS transistor M1 is shutdown the first pin of the first MOS transistor M1 is in a high level, the second triode Q2 is shutoff, a signal passes the sixth diode D6, the ninth resistor R9 controls a GS voltage of the second MOS transistor M2 be high, the second MOS transistor M2 turns on. When the fifth pin of the isolation transformer 55 is in a high level, the first triode Q1 is off, a signal passes through the fifth diode D5, the sixth resistor R6 controls the GS voltage of the first MOS transistor in a high level, the first MOS transistor M1 turns on; the first pin of the isolation transformer 55 is in a low level, the second triode Q2 turns on, the second triode Q2, the eighth resistor R8, the tenth resistor R10 compose a shutdown circuit for the second MOS transistor M2, a GS voltage of the second MOS transistor M2 is 0, and the second MOS transistor M2 is shutdown. That is, the constant current control chip U1 drives a switch transistor in the LLC resonance bridge 511 through controlling the isolation transformer 55, further controls the output current.

Further, to the resonance bridge, when the first MOS transistor M1 is about to be on, a voltage on a junction capacitor of the first MOS transistor M1 is lowered to 0, a body diode of the first MOS transistor M1 starts to turn on, making a voltage between the drain and the source (DS) of the first MOS transistor M1 be zero, that creates a condition for ZVS (zero voltage switch) of the first MOS transistor M1. When the body diode of the first MOS transistor M1 turns on, a resonance current iL2 starts to increase in a sinus format, in such a period, a current in the inductor L1 is larger than that in the Lm, a difference between both of them flows over a primary of the LLC transformer 512, a secondary rectifying diode of the first diode D1 starts to turn on, Lm is charging during this process, and only the inductor L1 and the first capacitor C1 join the resonance.

When the first MOS transistor M1 turns on, a signal on the gate of the first MOS transistor M1 is in a high level. The first MOS transistor turns on at a zero voltage. The current in the inductor L1 goes up, and still be larger than that in the Lm, a difference between them two passes the primary of the transformer, the first diode D1 which is a rectifying diode keeps on.

When the current in the inductor L1 increases to be equal to that in the Lm, no current will flow over the primary of the LLC transformer 512, the current in the first diode D1 is zero, and shuts down at a zero current, thus the first diode has almost no reverse recovery process. Now the Lm joins the resonance, the Lm and the inductor L1, the first capacitor C1 compose a resonance circuit connected in serial.

When the first MOS transistor M1 shuts down, the second MOS transistor M2 keeps to be shut off, now it comes to a dead time. A resonance current charges the junction capacitor of the first MOS transistor M1, while discharges a junction capacitor of the second MOS transistor M2. Now a current in the Lm is larger than that in the inductor L1, a difference between them two flows over the primary of the LLC transformer 512, the third diode D3 turns on, Up to the junction capacitor of the second MOS transistor M2 finishes discharging, during a plurality of periods thereafter, a work mode of the second MOS transistor M2 is similar to that of the first MOS transistor M1 during a plurality of periods earlier, thus no more details are described therein. From the analysis above, when the first MOS transistor M1 and the second MOS transistor M2 of the switch transistor are on, a voltage between the DS is close to zero, while the switch transistor is turned off as a capacitor, thus the switch transistor works at a zero voltage switch (ZVS) state.

Based on the driving power supply for the LED light bar network, the present invention further provides an LED light bar network current foldback circuit, due to a detailed description has been made above to the LED light bar network current foldback circuit, no more descriptions are listed herein.

The present invention further provides a TV set, comprising the driving power supply for the LED light bar network described above, since a detailed description on the driving power supply for the LED light bar network has been stated above in details, no more descriptions are listed herein.

All above, the driving power supply and the TV set provided by the present invention, wherein the LED light bar network current foldback circuit comprises a voltage reference module, a voltage division and sampling module, and a comparison module; the supplied voltage generates a voltage reference by the voltage reference module, and the voltage reference is then output to a voltage division and sampling module, and a comparison module; the voltage division and sampling module divides the voltage reference and outputs a reference voltage to the comparison module; the comparison module further receives a detection voltage obtained by converting a detection current of the LED light bar, and comparing the detection voltage with the reference voltage. When the detection voltage is greater than the reference voltage, the comparison module outputs a stop driving command to control the LED light bar to stop working. Being able to control the driving circuit to stop working after the current in the LED light bar, that is, the constant current output current, is abnormally increased, the present invention may effectively protect the LED light bar, and avoid a damage of the LED light bar from resulting in a high screen maintenance cost.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. An LED light bar network current foldback circuit, connecting to an LED light bar network, comprising: a voltage reference module, a voltage division and sampling module and a comparison module; wherein:
the voltage reference module is configured to let a supplied voltage pass through and generate a voltage reference to be outputted to the voltage division and sampling module and the comparison module;
the voltage division and sampling module is configured to perform a voltage division on the voltage reference, and output a reference voltage to the comparison module;
the comparison module is configured to: receive a detection voltage obtained by converting a detection current of the LED light bar network; compare the detection voltage with the reference voltage; and when the detection voltage is greater than the reference voltage, output a stop driving command to control the LED light bar network to stop working, the comparison module comprising a comparison chip and a protection unit configured to protect the comparison chip;
wherein:
the voltage reference module comprises: a first rectifying unit, configured to rectify a voltage provided by the LED light bar network to generate the supplied voltage for the comparison module; and a voltage generating unit configured to output the voltage reference to the voltage division and sampling module and the comparison module; and
the first rectifying unit of the voltage reference module comprises a first rectifier diode, a second rectifier diode, and a first conversion resistor, both positive poles of the first rectifier diode and the second rectifier diode are connected to an anode of the LED light bar network, both negative poles of the first rectifier diode and the second rectifier diode are connected to an eighth pin of the comparison chip and the protection unit through the first conversion resistor.

2. The LED light bar network current foldback circuit according to claim 1, wherein the protection unit comprises a Zener diode, a positive pole of the Zener diode is grounded, and a negative pole of the Zener diode is connected to the eighth pin of the comparison chip and the voltage generating unit.

3. The LED light bar network current foldback circuit according to claim 2, wherein the voltage generating unit comprises a second conversion resistor, one end of the second conversion resistor connects to the negative pole of the Zener diode, another end of the second conversion resistor connects to a third pin of the comparison chip and the voltage division and sampling module.

4. The LED light bar network current foldback circuit according to claim 3, wherein the voltage division and sampling module comprises a first voltage dividing resistor and a second voltage dividing resistor, one end of the first voltage dividing resistor connects to another end of the second conversion resistor, and another end of the first voltage dividing resistor connects to a sixth pin of the comparison chip and further connects to a fourth pin of the comparison chip and the ground through the second voltage dividing resistor.

5. The LED light bar network current foldback circuit according to claim 1, wherein a model of the comparison chip is AP4310 or TL103.

6. An LED light bar network driving power supply, connecting to an LED light bar network, comprising:
a constant current source module configured to provide a constant current with a current direction alternating to the LED light bar network; and
an LED light bar network current foldback circuit comprising a voltage reference module, a voltage division and sampling module and a comparison module,
wherein:
the voltage reference module is configured to let a supplied voltage pass through and generate a voltage reference to be outputted to the voltage division and sampling module and the comparison module;
the voltage division and sampling module is configured to perform a voltage division on the voltage reference, and output a reference voltage to the comparison module;
the comparison module is configured to: receive a detection voltage obtained by converting a detection current of the LED light bar network; compare the detection voltage with the reference voltage; and when the detection voltage is greater than the reference voltage, output a stop driving command to the constant current source module, to control the LED light bar network to stop working, the comparison module comprising a comparison chip and a protection unit configured to protect the comparison chip;
wherein:
the voltage reference module comprises: a first rectifying unit, configured to rectify a voltage provided by the LED light bar network to generate the supplied voltage for the comparison module; and a voltage generating unit configured to output the voltage reference to the voltage division and sampling module and the comparison module; and
the first rectifying unit of the voltage reference module comprises a first rectifier diode, a second rectifier diode, and a first conversion resistor, both positive poles of the first rectifier diode and the second rectifier diode are connected to an anode of the LED light bar network, both negative poles of the first rectifier diode and the second rectifier diode are connected to an eighth pin of the comparison chip and the protection unit through the first conversion resistor.

7. The LED light bar network driving power supply according to claim 6, wherein the constant current source module comprises a driving unit, a constant current control unit, a detection unit and a second rectifying unit, the LED light bar network comprises a plurality of LED light bar groups connected in parallel through the second rectifying unit, each LED light bar group comprises a plurality of LED light bars connected in series by the detection unit;

during each driving circle, the driving unit is configured to output alternatively a forward supply current and a reverse supply current during a first half cycle and a second half cycle, and output a supply current to the LED light bar network after rectified by the second rectifying unit, the detection unit is configured to detect a current in the LED light bar network, and convert the detected current into a voltage signal before outputting to the constant current control unit, and the constant current control unit is configured to control a work frequency of the driving unit according to the voltage signal, making a size of the supply current always constant.

8. The LED light bar network driving power supply according to claim 7, further comprising: a filter circuit, a PFC circuit and a constant voltage source module, an input AC power is converted into a DC and output to the PFC circuit through a low pass filtering process by the filter circuit, then the DC is output to the constant voltage source module and the constant current source module respectively after a power factor correction by the PFC circuit, the constant voltage source module provides a constant voltage accordingly for a main board according to a standby signal.

9. The LED light bar network driving power supply according to claim 8, wherein the constant voltage source module comprises a PWM control circuit and a flyback transformer, the PWM control circuit is configured to control the flyback transformer to output the constant voltage accordingly to the main board according to the standby signal received.

10. The LED light bar network driving power supply according to claim 9, wherein the driving unit comprises an LLC resonance bridge, an LLC transformer and a balancer, the LLC transformer is configured to output alternately the forward supply current and the reverse supply current during the first half cycle and the second half cycle, and output to the second rectifying unit after voltage divided by a balancer, the constant current control unit is configured to control a work frequency of the LLC resonance bridge according to the voltage signal, making a size of a supply current output by the LLC transformer always constant.

11. The LED light bar network driving power supply according to claim 10, wherein the constant current source module further comprises an isolation transformer, the isolation transformer is configured to drive the LLC resonance bridge to oscillate at a working frequency correspondingly according to a drive signal output by the constant current control unit.

12. The LED light bar network driving power supply according to claim 11, wherein the LLC resonance bridge comprises a first MOS transistor, a second MOS transistor, an inductor and a first capacitor, the balancer comprises a second capacitor; a drain of the first MOS transistor connects to a first output end of the PFC circuit, a gate of the first MOS transistor connects to a fifth pin of the isolation transformer, a source of the first MOS transistor connects to a fourth pin of the isolation transformer, a drain of the second MOS transistor, and a first pin of the LLC transformer; a gate of the second MOS transistor connects to a first pin of the isolation transformer, a source of the second MOS transistor connects to a second pin of the LLC transformer and the ground; one end of the first capacitor connects to the second pin of the LLC transformer through the inductor, another end of the first capacitor is grounded; a third pin of the LLC transformer connects to a first end of the second rectifying unit through the balancer, and a fourth pin of the LLC transformer connects to a second end of the second rectifying unit.

13. The LED light bar network driving power supply according to claim 12, wherein the detection unit comprises a first resistor and a second resistor.

14. The LED light bar network driving power supply according to claim 13, wherein the second rectifying unit comprises a first diode, a second diode, a third diode and a fourth diode.

15. The LED light bar network driving power supply according to claim 14, the second rectifying unit further comprises a third capacitor, a fourth capacitor, a fifth capacitor, a sixth capacitor, a seventh capacitor, and an eighth capacitor.

16. The LED light bar network driving power supply according to claim 15, wherein the constant current control unit further comprises a constant current control chip.

17. The LED light bar network driving power supply according to claim 16, wherein the isolation transformer and the LLC resonance bridge further connects to a drive circuit directly applied to driving the LLC resonance bridge, the drive circuit comprises a fifth diode, a sixth diode, a fifth resistor, a sixth resistor, a seventh resistor, an eighth resistor, a ninth resistor, a tenth resistor, a first triode and a second triode.

18. A television set, wherein comprising the LED light bar network driving power supply according to claim 6.

* * * * *